US010378687B2

(12) United States Patent
Barr et al.

(10) Patent No.: US 10,378,687 B2
(45) Date of Patent: Aug. 13, 2019

(54) APPARATUS AND METHOD FOR COUPLING (71) Applicant: CRISM Pty Ltd, Windang, NSW (AU)

(72) Inventors: Chris Michael Barr, Macquarie Hills (AU); Samuel Henry Carriage, Windang (AU)

(73) Assignee: Crism Pty Ltd, Windang, NSW (AU)

( * ) Notice: Subject to any disclaimer, the term of this patent is extended or adjusted under 35 U.S.C. 154(b) by 0 days.

(21) Appl. No.: 15/547,053

(22) PCT Filed: Mar. 19, 2016

(86) PCT No.: PCT/AU2016/050197
§ 371 (c)(1),
(2) Date: Jul. 27, 2017

(87) PCT Pub. No.: WO2016/149745
PCT Pub. Date: Sep. 29, 2016

(65) Prior Publication Data
US 2018/0023739 A1 Jan. 25, 2018

(30) Foreign Application Priority Data
Mar. 23, 2015 (AU) ............................ 2015901042

(51) Int. Cl.
F16L 37/092 (2006.01)
F16L 37/086 (2006.01)
(52) U.S. Cl.
CPC .......... F16L 37/086 (2013.01); F16L 37/092 (2013.01); F16L 37/0925 (2013.01)

(58) Field of Classification Search
CPC .............................. F16L 37/086; F16L 37/092
USPC ........ 285/104–105, 108, 113, 307, 317, 339, 285/342–343, 345, 351
See application file for complete search history.

(56) References Cited

U.S. PATENT DOCUMENTS 1,904,627 A * 4/1933 Olevin ................. H02G 3/0616
285/314
2,017,994 A * 10/1935 Spang ................... F16L 17/035
285/105
2,508,914 A 5/1950 Graham
(Continued)

FOREIGN PATENT DOCUMENTS

JP 01299390 A * 12/1989
JP 02008592 A * 1/1990
(Continued)

Primary Examiner — Anna M Momper
Assistant Examiner — Fannie C Kee
(74) Attorney, Agent, or Firm — Oppenhuizen Law PLC; David L. Oppenhuizen (57) ABSTRACT An apparatus (10) for coupling with a pipe (12), the apparatus (10) including a body assembly (13) having a body (14) adapted to fit with the pipe (12), and at least two gripping parts (16) moveably coupled to the body (14), the at least two gripping parts (16) being adapted to be moveable between an insertion condition, in which the gripping parts (16) are resiliently depressible to allow movement of the pipe (12) in a first insertion direction, and a gripping condition in which the gripping parts (16) each engage with opposing side walls (18) of the pipe (12) to restrict movement of the pipe (12) in a second opposing direction thereby coupling the apparatus (10) and the pipe (12).

15 Claims, 7 Drawing Sheets (56) References Cited

U.S. PATENT DOCUMENTS

| | | | | |
|---|---|---|---|---|
| 2,989,326 | A | * | 6/1961 | Seward .................... F16B 2/14 |
| | | | | 285/339 |
| 3,737,179 | A | | 6/1973 | White |
| 4,540,201 | A | * | 9/1985 | Richardson ......... F16L 37/1215 |
| | | | | 285/101 |
| 6,986,533 | B2 | * | 1/2006 | Ko ...................... F16L 37/0925 |
| | | | | 285/313 |

FOREIGN PATENT DOCUMENTS

| | | |
|---|---|---|
| WO | 1995023311 A1 | 8/1995 |
| WO | 2006135227 A1 | 12/2006 |
| WO | 2015033142 A1 | 3/2015 |

* cited by examiner

APPARATUS AND METHOD FOR COUPLING

RELATED APPLICATIONS

This is a National Stage of International Application No. PCT/AU2016/050197, filed Mar. 19, 2016, which claims priority from Australian provisional patent application no. 2015901042 filed on Mar. 23, 2015, the contents of which are incorporated by reference.

TECHNICAL FIELD

The invention relates to an apparatus and method for coupling. More specifically, the invention relates to an apparatus in the form of a fitting for coupling a member such as a pipe to a further member, a further pipe or structure, and a related method of use.

BACKGROUND

It is often desirable to couple members, such as pipes or tubes, with one another or with another structure. For example, one may wish to join two pipes to form a longer pipe or couple tubes used in a structure to form longer structural members.

In some applications, metal or steel pipes are required to be joined. One such application is the joining of metal pipes used to carry low or moderate to high-pressure fluids such as water, oil or gas. The joins for such pipes are required to be sealed and withstand a relatively high-pressure load. Typically, a hot welding process is used to join the pipes. Similar processes are used to join the pipes to other structures such as end flanges or the like.

A problem with the welding of the joints is that hot work is required which can be hazardous and require special procedures to be followed to inhibit the risk of explosion or fire. Another problem is that a skilled welder is required to perform the welding. In maintenance situations, this requires the welder to be on-site which may be expensive and in some instances the welder may not be available. Yet another problem is that welding joints is time consuming and also may require an additional technician for non-destructive testing.

The invention disclosed herein seeks to overcome one or more of the above identified problems or at least provide a useful alternative.

SUMMARY

In accordance with a first main aspect there is provided, an apparatus for coupling with a pipe, the apparatus including: a body assembly including a body adapted to fit with the pipe, and at least two gripping parts moveably coupled to the body, wherein the at least two gripping parts are adapted to be moveable between an insertion condition, in which the gripping parts are resiliently depressible to allow movement of the pipe in a first insertion direction, and a gripping condition in which the gripping parts each engage with opposing sides of the pipe to restrict movement of the pipe in a second opposing direction thereby coupling the apparatus and the pipe.

In an aspect, the body includes recesses in which each of the at least two gripping parts are at least partially located, each of the recesses including a tapered floor which is arranged to slidably guide the at least two gripping parts between the insertion condition and the gripping condition.

In another aspect, the recesses include a mouth arranged to receive a gripping portion of each of the at least two gripping parts and retaining channels arranged to receive retaining portions of the each of the at least two gripping parts.

In yet another aspect, the gripping portion includes a plurality of teeth arranged to engage with sidewalls of the pipe in the gripping condition.

In yet another aspect, the gripping portion includes a leading edge immediately prior to the plurality of teeth, the leading edge being arranged to depress the respective at least two gripping parts when the pipe is inserted in the first direction to the insertion condition.

In yet another aspect, the gripping portion includes a gripping surface shaped to fit with an outer surface of the pipe gripped condition.

In yet another aspect, the pipe has a circular cross section and the gripping surface is curved in a circumferential direction so as to substantially match the circular cross section of the pipe.

In yet another aspect, the apparatus further includes a biasing element arranged to bias the at least two gripping parts toward the gripping condition.

In yet another aspect, the body includes a pipe end of travel stop arranged to locate the pipe in the insertion condition.

In yet another aspect, wherein the body includes an aperture through which the pipe is insertable, the at least two gripping parts being located between the aperture and the pipe end of travel stop.

In yet another aspect, the body assembly includes at least one seal located between the aperture and the pipe end of travel stop, the seal being arranged to sealably engage with the pipe.

In yet another aspect, the body includes at least two seals, with one of the seals being located between the aperture and the at least two gripping parts and the other of the seals being located between the at least two gripping parts and the pipe end of travel stop, each of the seals being arranged to sealably engage with the pipe.

In yet another aspect, the body is provided in the form of a main body supporting the at least two gripping parts and an end body that couples to the main body.

In yet another aspect, the end body is arranged to provide a gripping part end of travel stop thereby retaining the at least two gripping parts.

In yet another aspect, the body assembly includes at least three gripping parts arranged at equidistant circumferential locations around an inner surface of the body.

In yet another aspect, the body assembly includes at least four gripping parts arranged at equidistant circumferential locations around an inner surface of the body.

In yet another aspect, the at least two gripping parts arranged at equidistant circumferential locations around an outer surfaces of the body so as to engage with an inner surface of the pipe in the gripping condition. The body assembly being at least partially received by the pipe.

In yet another aspect, the gripping parts are arranged to engage with an inner face or an outer face of the opposing sides of the pipe.

In yet another aspect, the body is arranged to receive the pipe and wherein the at least two gripping parts are arranged to engage with an outer face of the opposing side walls of the pipe.

In yet another aspect, wherein the body is arranged to be received by the pipe and wherein the at least two gripping parts are arranged to engage with an inner face of the opposing side walls of the pipe.

In yet another aspect, the body assembly includes a first aperture arranged to receive a first pipe from a first direction and a second aperture arranged to receive a second pipe from a second opposing direction so that the first and second pipes are substantially aligned so as to allow a fluid to flow there between, and wherein the body assembly includes a first set of the at least two gripping parts arranged to grip with the first pipe in a first gripping condition, and a second set of the at least two gripping parts arranged to grip with the second pipe a second gripping condition.

In yet another aspect, the body assembly includes an end of travel stop located between the first and second set of the at least two gripping parts.

In yet another aspect, the body assembly includes first aperture located toward one end arranged to receive the pipe and a flanged opening located toward a second end skirted by a flange.

In accordance with a second main aspect there is provided, an apparatus for coupling a first pipe and a second pipe, the apparatus including: a body having a first section adapted to receive the first pipe in an insertion direction and a second section adapted to receive the second pipe from an opposing insertion direction so that the first and second pipes are substantially axially aligned; and a first set of gripping parts moveably coupled to the first section of the body and a second set of gripping parts gripping parts moveably coupled to the second section of the body, wherein each the first and second sets of gripping parts are adapted to be moveable between an insertion condition, in which the gripping parts are resiliently depressible to allow movement of the first and second pipes in the respective insertion and opposing insertion directions, and a gripping condition in which the first and second sets of gripping parts engage with opposing walls of the respective first and second pipes to restrict movement of the first and second pipes in a respective retraction direction and an opposing retraction direction.

In accordance with a third main aspect there is provided, a method for coupling a pipe to an apparatus, the method including: fitting a free end of the pipe with a body of the apparatus such that at least two gripping parts moveably coupled to the body are resiliently depressible so as to allow movement of the pipe in the first direction, and moving the pipe in a second opposing direction so that the least two gripping parts become engaged with opposing side walls of the pipe to restrict movement of the pipe in the second opposing direction thereby coupling the apparatus and the pipe.

In accordance with a fourth main aspect there is provided, a method for coupling a first pipe and a second pipe using an apparatus so that the first and second pipes are substantially aligned to allow fluid to flow therebetween, the method including: inserting the first pipe in a first direction into a first aperture of the apparatus such that a first set of gripping parts of the apparatus engages with opposing side walls of the first pipe so as to restrict movement of the pipe in a second direction opposing the first direction; and inserting the second pipe in the second direction into a second aperture of the apparatus such that a second set of gripping parts of the apparatus engages with opposing side walls of the second pipe so as to restrict movement of the second pipe in the first direction opposing the second direction, the first and second pipes being thereby coupled and substantially aligned so to allow the fluid to flow therebetween.

BRIEF DESCRIPTION OF THE FIGURES

The invention is described, by way of non-limiting example only, by reference to the accompanying figures, in which.

DETAILED DESCRIPTION

Figure 1:
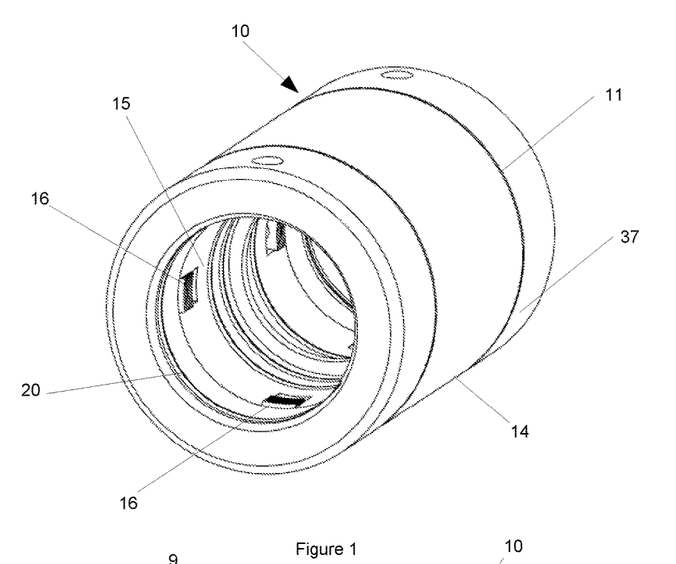
FIG. 1 is a perspective view illustrating a first example of the apparatus.
Figure 2:
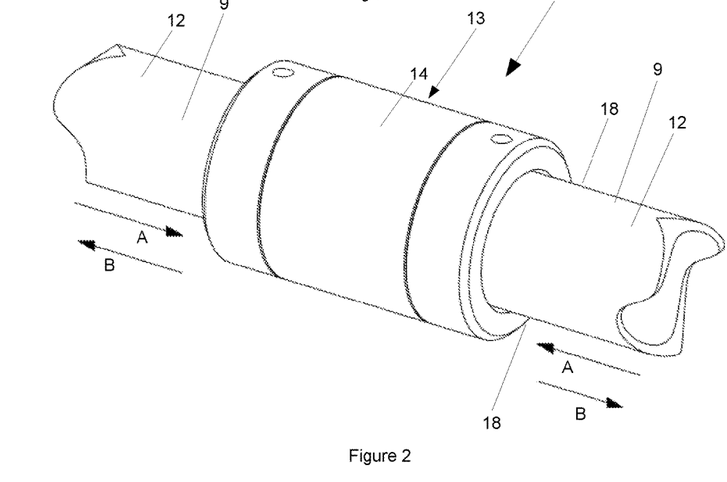
FIG. 2 is a perspective view illustrating the first example of the apparatus in a connected or coupled condition joining two pipes.

Referring to FIG. 1, there is shown an apparatus 10 in the form of a fitting 11 for coupling with one or more members 9 in the form of pipes 12 (shown in FIG. 2). The apparatus 10 including a body assembly 13 having a body 14 adapted to at least partially receive the one or more pipes, 12, and a least two gripping parts 16 moveably coupled to the body 14.

The at least two gripping parts 16 are adapted to be moveable between an insertion condition, in which the gripping parts are resiliently depressible to allow movement of the pipe 12 in a first insertion direction (indicated by arrow "A"), and a gripping condition in which the gripping parts each engage with opposing side walls 18 of the pipe 12 to restrict movement of the pipe 12 in a second opposing direction (indicated by arrow "B") thereby coupling the apparatus 10 and the pipe 12. The pipe walls 18 having an outer surface 33 and an opposing inner surface 35.

Various examples and forms of the invention are disclosed herein which include the apparatus 10 coupling two pipes 12 (as shown in FIGS. 1 to 9) and the apparatus 10 coupling with a single pipe 12 (as shown in FIGS. 10 to 14). It is noted the invention is described with reference to fitting with a round pipe as a preferred application only. However, the apparatus 10 may also find use in coupling square pipes, solid or hollow structural members or bars. Accordingly, the apparatus 10 may find uses in piping applications as well as the more general joining of members such as in assembly of scaffolding, fencing or the like.

Figure 3:
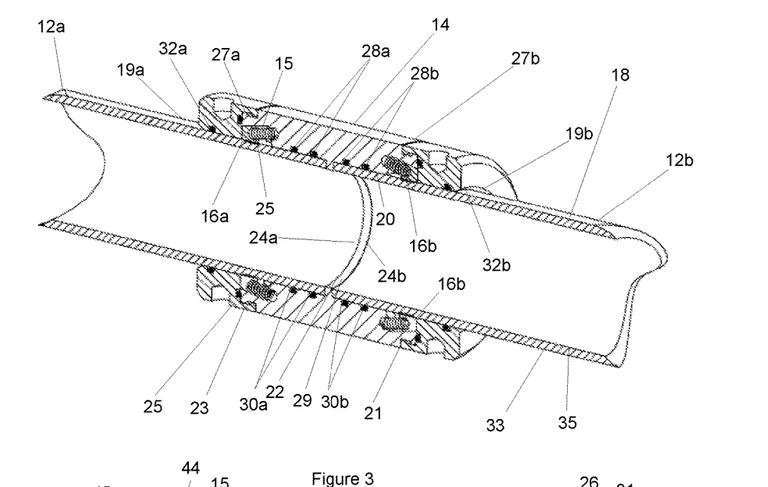
FIG. 3 is a perspective sectional view illustrating the first example of the apparatus in the connected condition joining two pipes.
Figure 4:
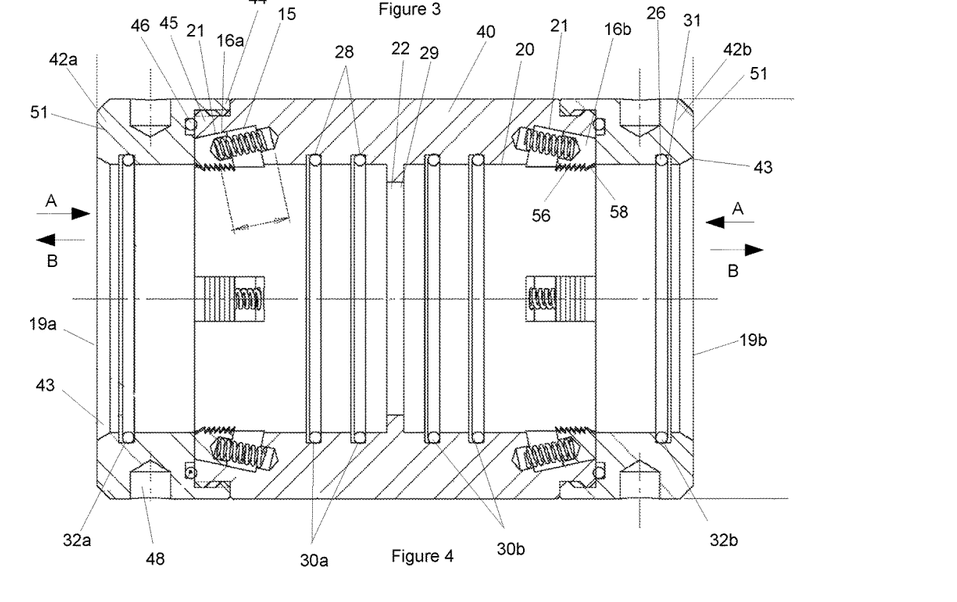
FIG. 4 is a side perspective sectional view illustrating the first example of the apparatus.
Figure 5:
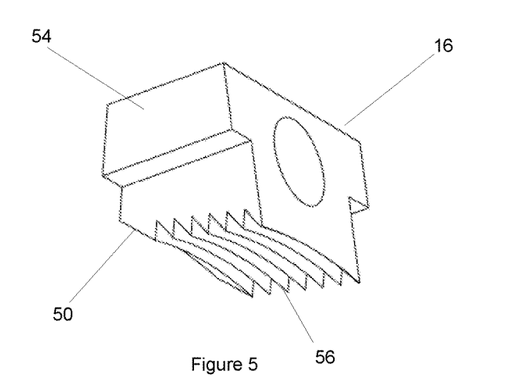
FIG. 5 is a perspective view illustrating a gripping part of the apparatus.

Turning now to the apparatus 10 in more detail and referring additionally to FIGS. 3 and 4, the body 14 includes recesses 15 in which each of the gripping parts 16 are at least partially located, each of the recesses 15 including a tapered floor 21 and a biasing element 23 in the form of a spring 25 which are arranged to slidably guide the gripping parts 16 between the insertion condition and the gripping condition. The body 14 includes an inner face 20 and an external outer face 37.

The tapered floor 21 and the spring 25 allow the gripping parts 16 to be retracted toward the inner face 20 of the body 14 to allow the passage of the pipes 12 in the insertion condition into the body 14. More specifically, the floor tapers 21 away from the inner face 20 toward the insertion direction, indicated by Arrow "A", thereby allowing the retracted position of the gripping parts 16. In this retracted position, the spring 25 is energised via compression.

Once compressed, the spring 25 then urges the gripping parts 16 back towards a fully elevated active position in which gripping parts 16 slide back up the tapered floor 21 so as to bear or engage the outer surface 33 of the pipes 12. As the pipes 12 are moved in the retraction direction, indicated by Arrow "B" the gripping parts 16 continue to move toward the elevated active position that reduces the diameter between the gripping parts 16 thereby further gripping or "wedging" the pipes in place. The more the pipes 12 are moved in the retracted condition, the further the "wedging" force increases thereby retaining or coupling the pipes 12 and the body assembly 14 by a friction fit.

In this example, the body 14 includes a first section 27a having a first aperture 19a in which the first pipe 12a is receivable and a second section 27b having a second aperture 19b in which the second pipe 12b is receivable. Each of the first and second sections 27a, 27b include a set of four of the gripping parts 16 equally spaced apart around an inner face 20 of the body 14.

The spacing between the centers of four of the gripping parts 16, in a circumferential direction, is about 90 degrees. It is noted that, in other examples, if only two gripping parts 16 are used the circumferential spacing is about 180 degrees and if three gripping parts 16 are used the circumferential spacing is about 120 degrees. The location of the gripping parts 16 allow engagement of the gripping parts 16 on opposing outer faces of the pipes 12 thereby acting against each other and also assisting to center the pipes 12 within the body assembly 14.

The body assembly 13, more specifically each of the sections 27a, 27b of the body 14 include at least one seal 26 arranged to form a seal between the pipe 12 and the body 14 in the gripping condition in which the pipe 12 is received within the body 14. In this example, the at least one seal 26 is provided in the form of plurality of O-ring seals 28 which are located within annular grooves 31 in the inner face 20 of the body assembly 14. The seals 26 are arranged on opposing sides of the gripping parts 16 so as to provide sealing on each side of the gripping parts 16 and also assist with the alignment of the pipes 12 within the body assembly 14.

The body 14 also includes a reduced diameter section or neck 22 located between the set of four of the gripping parts 16a and 16b. The neck 22 provides an end of travel stop 29 against which free ends 24a and 24b of the pipes 12a and 12b are separated or located in use. Preferably, the free ends 24a, 24b of the pipes 12a and 12b are abutted against the end of travel stop 29 thereby allowing a pre-determined length of the pipes 12 to be received and located relative to the gripping parts 16 and the seals 26.

Each of the sections 27a and 27b include a plurality of the seals 28a, 28b having inner seals 30a, 30b located between the gripping parts 16 and the end of travel stop 29, and outer seals 32a, 32b located between the gripping parts 16 and the apertures 19a and 19b. Accordingly, each of the pipes 12 is sealed on both sides of the gripping parts 16. The arrangement of the annular O-ring seals assists to align and locate the pipes 12 within the body 14.

In this example, the body assembly 13 includes the body 14 in the form of a main or central body 40 located between two end bodies 42a and 42b. The main body 40 and two end bodies 42a and 42b are adapted to sealably connect with one another in a fitted condition. The main body 40 carries the gripping parts 16a, 16b and inner seals 30a, 30b, and the outer bodies 42a, 42b serve to at least partially retain the gripping parts 16 and carry the outer seals 32a, 32b, and provide the apertures 19a and 19b. It is noted that whilst main body 40 and end bodies 42a, 42b are shown in this example as separate parts, a unitary cast version of the body assembly 13 is also contemplated in which the body 14 in the form of the main or central body 40 and end bodies 42a, 42b are formed as a single cast, machined or printed component or fitting.

In this example, the main body 40 and end bodies 42a, 42b may be threadedly coupled and include corresponding flanges 44, 45 as well as a further O-ring seal 46 between the main body 40 and end bodies 42a, 42b. The end bodies 42 include aperture 48 on an outer circumferential face 51 thereof. The aperture 48 is adapted to be coupled with a tool to fit and remove the end bodies 42a, 42b. The end bodies 42a, 42b include a chamfered mouth 43.

Figure 6:
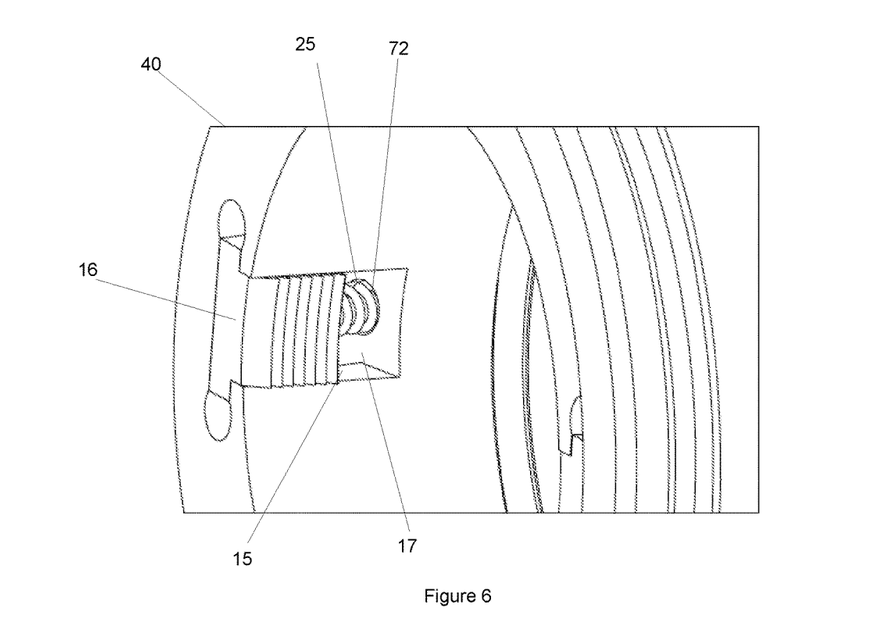
FIG. 6 is a part perspective view illustrating a main body of the apparatus with the end removed.

When the end bodies 42a, 42b are removed (as shown in FIG. 6) the gripping parts 16 may be pressed inwardly to reduce the gripping force on the pipes 12 thereby allowing removal of the pipes 12. The gripping parts 16 and/or springs 25 may then also be removed for maintenance.

The recesses 15 include a mouth 17 arranged to receive a gripping portion 50 of each of the gripping parts 16 and retaining channels 52 arranged to receive retaining portions 54 of each of the gripping parts 16. The gripping portion 50 includes a plurality of teeth 56 arranged to engage with sidewalls of the pipes 12 in the gripping condition. The teeth 56 are arranged in a saw tooth pattern and are sloped or taper inwardly into the main body 40. The channels 52 are closed or blinded by the end bodies 42a, 42b to retain the gripping parts 16.

The gripping portion 50 includes a leading edge 58 immediately prior to the plurality of teeth 56, the leading edge 58 is arranged to depress the respective gripping parts when the pipe 12 is inserted in the first direction to the insertion condition. As is best shown in FIG. 4, in the raised position the plurality of teeth 56 project radially inwardly of the inner face 20 of the main body 40. However, the front of the leading edge 58 remains slightly lower than the inner face 20 and leads upwardly to the plurality of teeth 56. This allows the free ends 24a, 24b of the pipe 12 to slide past and depress the gripping parts 16.

Figure 7:
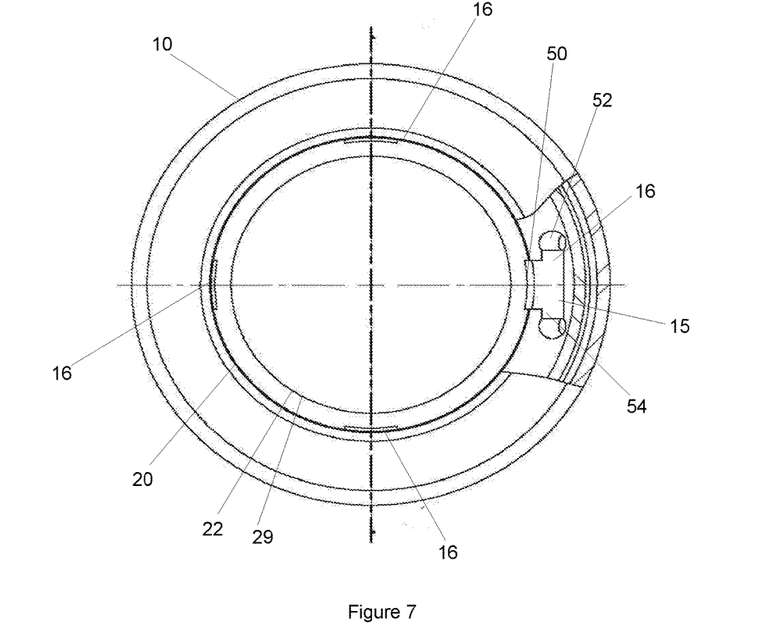
FIG. 7 is a front view illustrating the apparatus showing a part sectional view of the recess in which the gripping part is retained.
Figure 8:
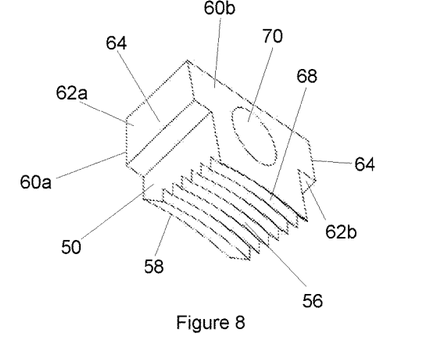
FIG. 8 is a perspective view illustrating the gripping part of the apparatus.
Figure 9:
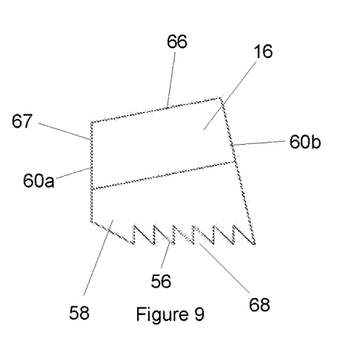
FIG. 9 is an end view illustrating the gripping part.
Figure 10:
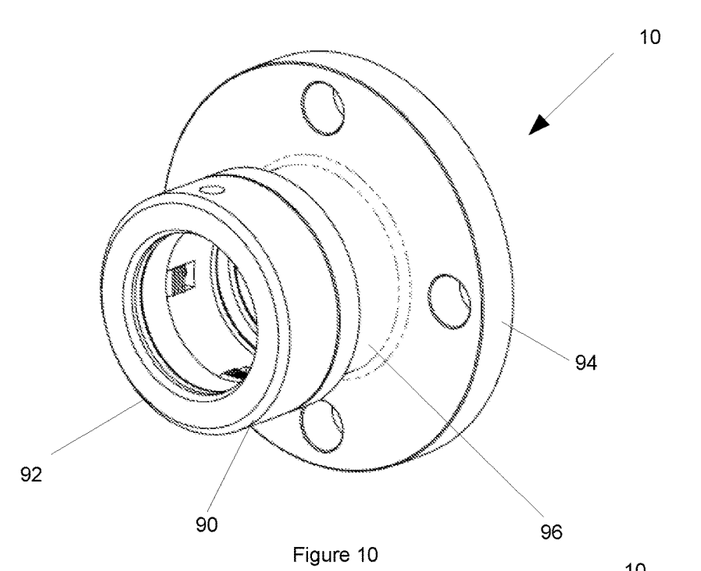
FIG. 10 is a perspective view illustrating a second example of the apparatus for coupling a pipe to a flange joint.
Figure 11:
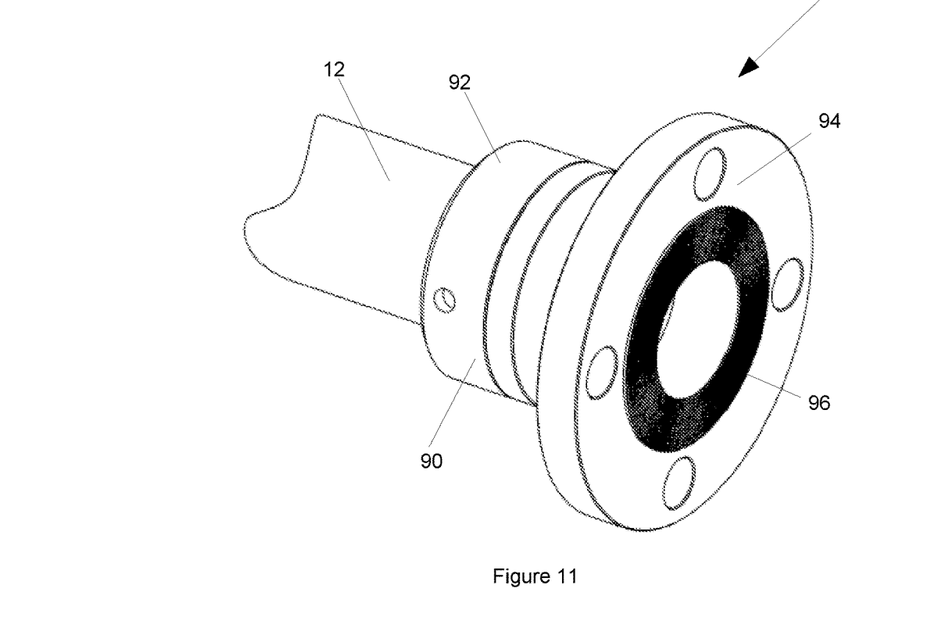
FIG. 11 is another perspective view illustrating a second example of the apparatus showing a pipe coupled to the apparatus.
Figure 12:
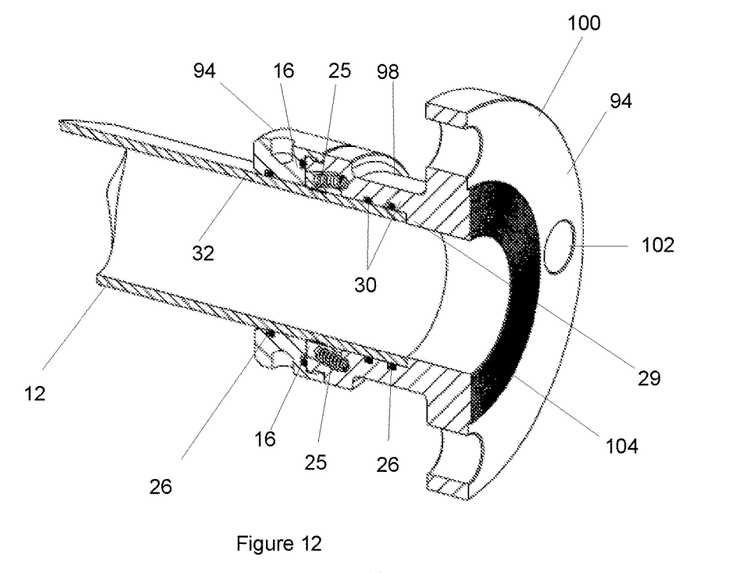
FIG. 12 is a perspective cut away view illustrating the second example of the apparatus coupled with the pipe.
Figure 13:
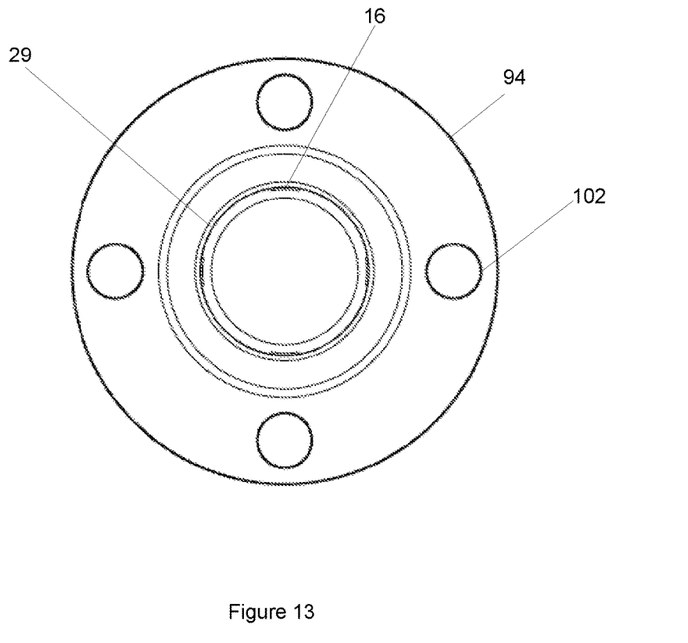
FIG. 13 is a front view illustrating the second example of the apparatus.
Figure 14:
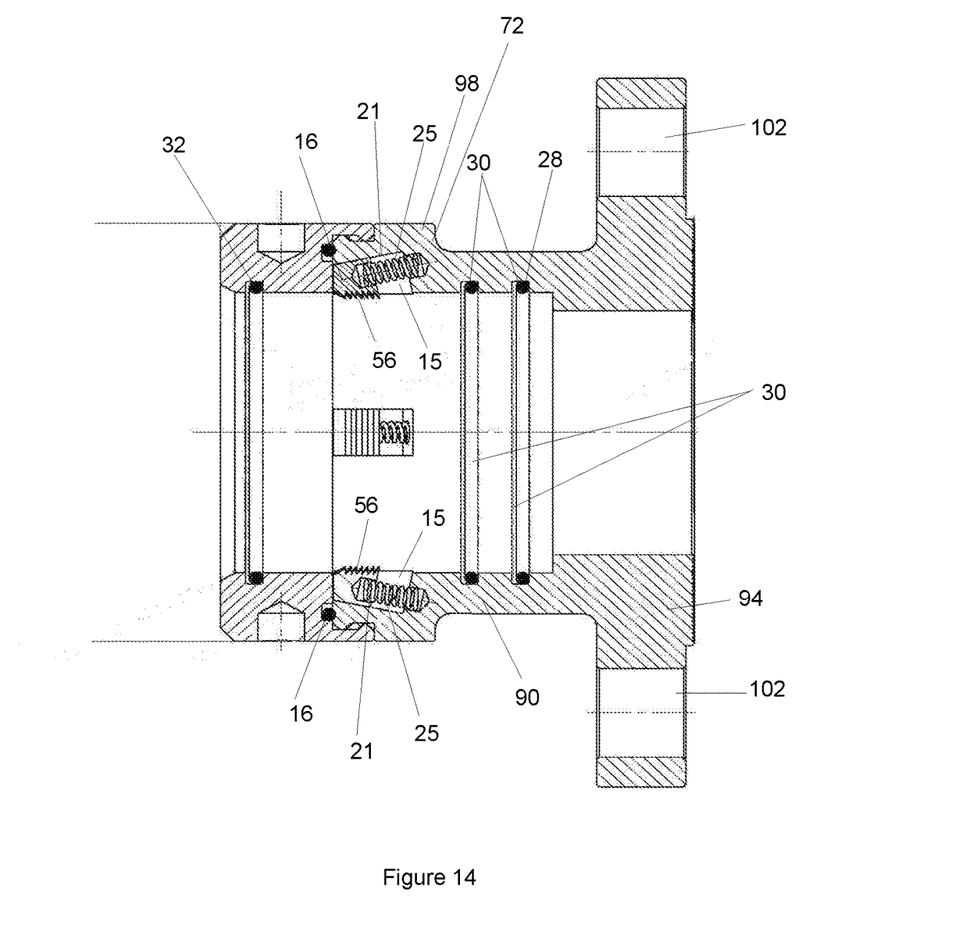
FIG. 14 is a side sectional view illustrating the second example of the apparatus.

Turning to the gripping parts 16 in more detail and referring more specifically to FIGS. 7 to 9, the gripping parts 16 include opposing ends 60a and 60b, and opposing sides 62a and 62b. The gripping portion 50 is relatively narrower than the retaining portion 54 which include wings 64 that slide within the channels 52. The retaining portion 54 includes base surface 66 which slides relative to the tapered floor and the gripping portion 50 includes a gripping surface 68 provided by the tips of the teeth.

The base surface 66 and gripping surface 68 are angled or tapered relative to one another so to give the gripping part 16 a wedge shaped side profile as is best shown in FIG. 9. The angling between the base surface 66 and gripping surface 68 is such that the gripping surface 68 maintains a substantially parallel alignment with the outer surface of the pipe when being moved between the insertion and gripping conditions. This assists with maintaining a maximum surface contact area.

The gripping surface 68 is defined by the plurality of teeth 56 shaped to match the curvature of at least one of the pipes 12 or inner surface of the main body 40 in a circumferential direction. More specifically, each of the row of tips of the teeth 56 are curved or radiuses between the opposing sides 62a and 62b of the gripping portion 50. Again, this assists with maintaining a maximum surface contact area with the pipe 12 thereby assisting to retain and wedge couple the pipes 12 and the apparatus 10.

The end 60b includes an aperture 70 into which a first end of the spring 25 is received and the main body 40 includes an aperture 72 into which the second end of the spring 25 is received. The spring 25 is held at an angle similar to the tapered floor relative to the inner face 20 of the main body 40. The opposing end 60a includes a surface 67 that abuts with the end bodies 42a, 42b in a fully elevated position to retain and secure the gripping parts 16.

Referring now to FIGS. 10 to 14, there is shown a second example of the apparatus 10 in which like numerals denote like parts. In this example, the apparatus 10 functions in a similar way to the first example shown above. However, in this example, the apparatus 10 includes a body assembly 90 adapted to receive and secure a single pipe 12 (shown in FIG. 11) at a first end 92 and having a flange 94 located at an opposing end 96 which is arranged to couple with a corresponding external flange fitting (not shown).

The body assembly 90 includes a main body 98, which is arranged in a similar way to main body 40 aside from the flange fitting 94 and a single end body 42 coupled to the first end 92. The main body 98 includes similarly arranged O-ring seals 28, end stops 29, and includes a single set of four gripping parts 16 which are arranged to grip with and secure the pipe 12 to the body assembly 90. The flange fitting 94 includes an annular body 100 including apertures 102 to secure the flange 94 to a corresponding flange and a second gasket 104 to assist the sealing. The other parts of the second example of the apparatus 10 are the same as those described above in relation to the first example and are not again described here. However, the main parts are indicted by the same reference numerals.

A method of use may include the steps of a user inserting free ends 24a, 24b of respective pipes 12, in the insertion direction, into the body assembly 14, 90 until the free ends 24a, 24b are abutted against the end of travel stops 29. The user may then slightly pull or retract the pipes 12 until the gripping parts 16 "bite" with the pipes 12 to test the connection. The pipe or pipes 12 are then sealably coupled to the apparatus 10. Removal, of the pipes 12 may include removal of ends 42a, 42b from the main body 40, 98 and then actuation or depression of the gripping parts 16 to disengage with the pipes 12 thereby allowing removal of the pipes 12.

It is also contemplated that further examples of the apparatus may be produced in a reverse configuration in which the body assembly carries the gripping parts on the outer surface of the body assembly and the body assembly is arranged to be received by the one or more pipes, tubes or railings. In this arrangement, the gripping parts face outwardly of the body assembly so that, in the gripping condition, the gripping parts are able to grip an inner face of the pipe, tube or railing walls and the body assembly is substantially concealed by the one or more pipes, tubes or railings in which it is received. This configuration may be utilised to join pipes, tubes or railings that depending on the application may or may not carry fluid. Accordingly, this example enables the internal joining of pipes, tubes and railings.

Advantageously, each of examples of the apparatus as described above allows one or more pipes (or similar structures such as tubes) to be connected in a high strength manner without the need for welding or specialised tools. This allows the one or more pipes to be connected without the need for welders or other such skilled trades people. Furthermore, as welding is not required, the connection process may be undertaken in situations where hot work is not permissible or would require shutdown procedures to be followed before work may commence. Accordingly, the "quick-connect" functionality of the apparatus provides substantial time and/or cost savings.

The arrangement of circumferential gripping parts and annular seals allows the pipes to be gripped and located on opposing sides to be held within the body assembly of the apparatus. The end stops allow a user to easily locate the insertion depth of the pipes. The spring assisted gripping parts automatically provide the initial "bite" to grip with the pipes, and the tapered floor surfaces as well as the wedge shape of the gripping parts and gripping surface shape defined by the teeth allow maximised contact surface between the gripping part and the pipe. The annular seals being arranged on both sides of the gripping parts to seal with the pipes also assist with alignment of the pipes with the body assembly. This allows pipes, in particular fluid carrying pipes, to be quickly and safely connected.

It is noted that whilst the apparatus 10 has been described as preferably fitting with a pipe or coupling pipes 12. The apparatus 10 may fit with a variety of members 9 such as, but not limited to, tubes, bars, rods, profiled sections or the like. Accordingly, throughout this specification and the claims which follow, any reference to the apparatus being suitable for use with one or more pipes should be interpreted broadly as also including within scope other similar members such as, not limited to, tubes, bars, rods, railings profiled sections or the like.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

We claim:

1. An apparatus for coupling with a pipe, the apparatus including:
   a body assembly having a body adapted to fit with the pipe in a first insertion direction in an insertion condition and a removable end body which couples to the body,
   at least two gripping parts having respective gripping surfaces arranged to grip with opposing side walls of the pipe in a gripping condition, and
   at least two biasing elements arranged to each resiliently associate a corresponding one of the at least two gripping parts with the body,
   wherein the body includes at least two recesses formed in a pipe facing surface of the body into which respective portions of the at least two gripping parts are at least partially located, the at least two recesses each including retaining channels arranged to slidingly receive retaining portions of the respective at least two gripping parts, and
   wherein the at least two biasing elements are at least partially located within respective portions of the at least two recesses between the body and respective portions of the at least two gripping parts, and
   wherein the at least two recesses include respective tapered floors that taper away from the pipe facing surface in the first insertion direction so as to slidably guide the at least two gripping parts between the insertion condition, in which the at least two gripping parts are slidable in the first insertion direction relative to the tapered floor so that the gripping surfaces thereof are relatively resiliently depressed toward the pipe facing surface so as to allow movement of the pipe in the first insertion direction, and
   the gripping condition in which the at least two gripping parts are urged by the respective at least two biasing elements so as to be slidable relative to the respective tapered floors in a second opposing direction so that the gripping surfaces become elevated relative to the pipe facing surface and engaged with the opposing side walls of the pipe so that the at least two gripping parts are substantially wedged between the respective tapered floors and the opposing side walls of the pipe thereby coupling the apparatus and the pipe, and
   wherein in the gripping condition the end body is removable from the body so as to allow the at least two gripping parts to be pressed in the first insertion direction thereby allowing removal of the pipe.

2. The apparatus according to claim 1, wherein the at least two biasing elements are provided in the form of springs at least partially located between the body and the respective at least two gripping parts, each of the springs being held at an angle substantially similar to the respective tapered floors.

3. The apparatus according to claim 2, wherein the at least two gripping parts each include respective gripping portions having the gripping surfaces, wherein the at least two recesses include respective mouths arranged to receive the gripping portions.

4. The apparatus according to claim 3, wherein the gripping portions each include a plurality of teeth that provide the gripping surfaces, the plurality of teeth being arranged to engage with the opposing sidewalls of the pipe in the gripping condition.

5. The apparatus according to claim 4, wherein the gripping portions each include a leading edge immediately prior to the plurality of teeth, the leading edge being arranged to depress the respective at least two gripping parts when the pipe is inserted in the first insertion direction to the insertion condition.

6. The apparatus according to claim 5, wherein each leading edge is at least partially recessed relative to the pipe facing surface.

7. The apparatus according to claim 1, wherein the gripping surfaces are curved in shape to fit with a surface shape of the pipe in the gripping condition.

8. The apparatus according to claim 1, wherein the body includes a pipe end of travel stop arranged to locate the pipe in the insertion condition.

9. The apparatus according to claim 8, wherein the body includes an aperture through which the pipe is insertable, the at least two gripping parts being located between the aperture and the pipe end of travel stop.

10. The apparatus according to claim 9, wherein the body includes at least one seal located between the aperture and the pipe end of travel stop, the seal being arranged to sealably engage with the pipe.

11. The apparatus according to claim 1, wherein the body is arranged to receive the pipe and wherein the at least two gripping parts are arranged to engage with an outer face of the opposing side walls of the pipe.

12. The apparatus according to claim 1, wherein the body assembly includes a first aperture arranged to receive a first pipe from a first direction and a second aperture arranged to receive a second pipe from a second opposing direction so that the first and second pipes are substantially aligned so as to allow a fluid to flow therebetween, and,
   wherein the body assembly includes a first set of the at least two gripping parts arranged to grip with the first pipe in a first gripping condition, and a second set of the at least two gripping parts arranged to grip with the second pipe in a second gripping condition.

13. The apparatus according to claim 12, wherein the body assembly includes an end of travel stop located between the first set and the second set of the at least two gripping parts.

14. The apparatus according to claim 1, wherein the retaining portions are provided in the form of wings that extend from opposing sides of each of the least two gripping parts.

15. A method for coupling a pipe to an apparatus, the method including:
   fitting a free end of the pipe within a body of the apparatus in a first direction such that at least two gripping parts moveably associated with the body by respective biasing elements are resiliently slidable in the first direction along respective tapered floors of recesses within a pipe facing surface of the body so that gripping surfaces of the at least two gripping parts become resiliently depressed and compress the biasing elements located at least partially within respective portions of the recesses so as to allow movement of the pipe in the first direction,
   moving the pipe in a second opposing direction so that the at least two gripping parts are at least initially urged by the respective biasing elements in the second opposing direction sliding along the respective tapered floors such that the gripping surfaces become relatively elevated and engaged with opposing side walls of the pipe so that the at least two gripping parts are substantially wedged between the respective tapered floors and the opposing side walls of the pipe so as to restrict movement of the pipe in the second opposing direction thereby coupling the apparatus and the pipe, and removing an end body coupled to the body and pressing exposed ends of the at least two gripping parts in the first direction thereby allowing removal of the pipe.

* * * * *